United States Patent [19]
Edwards et al.

[11] Patent Number: 5,853,034
[45] Date of Patent: Dec. 29, 1998

[54] DISPENSING SYSTEM AND METHOD FOR DISPENSING A CONCENTRATED PRODUCT AND CONTAINER FOR USE THEREWITH

[75] Inventors: Maitland R. Edwards, Lakeville; Dale W. Groth, Edina; Eric R. Balz, Eagan, all of Minn.

[73] Assignee: Ecolab Inc., St. Paul, Minn.

[21] Appl. No.: 511,398

[22] Filed: Aug. 4, 1995

[51] Int. Cl.⁶ .................................................. B65B 3/00
[52] U.S. Cl. ........................... 141/330; 141/2; 141/9; 141/18; 141/100; 222/88; 222/541.1; 222/541.6
[58] Field of Search .......................... 141/2, 9, 18, 21, 141/91, 100, 106, 329, 330, 364, 375, 319; 222/81, 82, 88, 541.1, 541.2, 541.6, 541.7, 129.1, 129.2

[56] References Cited

U.S. PATENT DOCUMENTS

| | | | |
|---|---|---|---|
| 1,142,210 | 6/1915 | Wagner | 141/330 |
| 2,609,967 | 9/1952 | Persons . | |
| 2,872,951 | 2/1959 | Wilkerson | 141/329 X |
| 2,957,501 | 10/1960 | Holmes | 141/2 |
| 2,973,758 | 3/1961 | Murrish | 141/330 X |
| 3,291,348 | 12/1966 | Chibret et al. | 141/9 X |
| 3,385,475 | 5/1968 | Loe | 222/82 X |
| 3,596,801 | 8/1971 | Barnack . | |
| 3,645,234 | 2/1972 | Schroer . | |
| 3,655,096 | 4/1972 | Easter | 222/82 |
| 3,943,960 | 3/1976 | Syrenne . | |
| 3,970,121 | 7/1976 | Brandt | 141/2 |
| 4,037,757 | 7/1977 | Green | 222/129.2 |
| 4,040,389 | 8/1977 | Walters . | |
| 4,045,004 | 8/1977 | Berger | 222/88 X |
| 4,088,246 | 5/1978 | Klingaman | 222/88 |
| 4,345,627 | 8/1982 | Cassia | 141/18 |
| 4,391,308 | 7/1983 | Steiner | 141/18 |
| 4,469,146 | 9/1984 | Campbell et al. | 141/9 |
| 4,600,125 | 7/1986 | Maynard, Jr. | 222/81 |
| 4,614,437 | 9/1986 | Buehler | 141/329 X |
| 4,615,360 | 10/1986 | Jacobs | 141/18 |
| 4,781,679 | 11/1988 | Larkin . | |
| 4,872,571 | 10/1989 | Crecelius et al. | 222/541.1 |
| 4,905,904 | 3/1990 | Ohara et al. . | |
| 4,930,686 | 6/1990 | Ellison | 141/2 X |
| 4,947,739 | 8/1990 | Owen | 141/18 |
| 4,949,870 | 8/1990 | Cazes . | |
| 5,056,686 | 10/1991 | Jarrett | 222/129.2 |
| 5,072,762 | 12/1991 | Jimenez . | |
| 5,152,429 | 10/1992 | Billings | 222/129.2 |
| 5,170,912 | 12/1992 | Du | 222/129.2 |
| 5,224,619 | 7/1993 | Dilworth et al. . | |
| 5,249,708 | 10/1993 | Magness . | |
| 5,316,053 | 5/1994 | Waber | 141/9 X |
| 5,316,058 | 5/1994 | Spektor et al. | 141/319 |
| 5,329,976 | 7/1994 | Haber et al. | 141/329 X |
| 5,344,231 | 9/1994 | Jönsson et al. . | |
| 5,379,813 | 1/1995 | Ing | 141/364 |
| 5,405,053 | 4/1995 | Zublin . | |
| 5,425,404 | 6/1995 | Dyer | 141/21 X |
| 5,431,201 | 7/1995 | Torchia et al. | 141/329 X |
| 5,505,235 | 4/1996 | Gorokhovsky et al. | 141/319 |
| 5,509,578 | 4/1996 | Livingstone | 222/82 |
| 5,584,327 | 12/1996 | Thomas et al. | 141/18 |

FOREIGN PATENT DOCUMENTS 0 605 395 A1  7/1994  European Pat. Off. .

*Primary Examiner*—J. Casimer Jacyna
*Attorney, Agent, or Firm*—Merchant, Gould, Smith, Edell, Welter & Schmidt, P.A.

[57] ABSTRACT

A dispensing system and method of dispensing utilize a container housing a concentrated product which is filled with a diluent to form a use dilution, then is subsequently installed into a dispenser having means for automatically opening the container to give the dispenser access to the use dilution. The container includes a cap disposed thereon with a pierceable member that permits access to the interior cavity of the container when pierced. The cap is removable to permit the container to be filled with diluent prior to installation in the dispenser.

19 Claims, 4 Drawing Sheets

DISPENSING SYSTEM AND METHOD FOR DISPENSING A CONCENTRATED PRODUCT AND CONTAINER FOR USE THEREWITH

FIELD OF THE INVENTION

The invention generally relates to a dispensing system for dispensing a concentrated product. More specifically, the invention relates to a dispensing system for diluting a solid or liquid concentrated product and delivering the same to a point of use.

BACKGROUND OF THE INVENTION

Chemical products are used as additives for a variety of applications, e.g. to treat cooling water which is recirculated in the cooling systems of commercial heating ventilating and air conditioning (HVAC) systems. Most cooling water typically includes minerals that may induce scale or corrosion in the cooling system components as the water evaporates during the cooling process. In addition, undesired microbiological growth may occur in the cooling water over time. To deal with these concerns, chemical additives are typically added to the cooling water to inhibit scale formation, corrosion and/or microbiological growth.

Conventional HVAC cooling systems typically use a ready-to-use liquid treatment product as an additive. This product is typically provided in large drums or totes and is added at a metered rate to the cooling water by a dispensing system. However, the liquid product is typically expensive and difficult to use and transport. In particular, the ready-to-use product must be purchased, transported, and stored in large volumes to meet the requirements of typical HVAC cooling systems. The large volume of product that must be stored takes up a great deal of space in a facility, and further poses a safety hazard due to the difficulty in handling large quantities of a liquid product.

It has been found, on the other hand, that substantial improvements may be obtained by using a reconstitutable concentrated product instead of conventional ready-to-use liquid treatment products. For example, Water Care 9575 solid concentrated product available from Ecolab Inc. is a granular or powder concentrate which may be added to a suitable quantity of water and stored in a 60 to 110 gallon day tank from which the resulting diluted product is dispensed. An agitator is used to initially obtain a uniform solution of dissolved product.

By "concentrated product" what is meant is a concentrated material (e.g., a solid, semi-solid, liquid etc.) that is typically mixed with a diluent such as water to form a use dilution which may be a solution, a suspension, an emulsion, etc. The use dilution may be used as is, or may be further diluted (e.g., in an HVAC cooling system where the additive is diluted in the sump of a cooling system) or mixed with other materials.

The use of a reconstitutable concentrated product offers several benefits, most notably savings in cost, transport and storage since less concentrated product is required, the concentrated product is less expensive to transport and the product and its associated storage/dispensing equipment require less floor space in a facility. However, it has been found that it is difficult to reliably control the concentration of a concentrated product in a day tank because operators are relied upon to add the proper amount of concentrated product to the tank. If too much concentrated product is used, the product is wasted, and if too little is used, the resulting mixture may not be as effective. In addition, equipment costs are still relatively high due to the need for a day tank and an agitator to maintain a uniform concentration in the tank. Moreover, the day tank still requires a significant amount of floor space in a facility.

Therefore, a need exists for a dispensing system and method for dispensing a concentrated chemical product into cooling water and other related applications which is safer, less expensive, easier to use and more controllable.

SUMMARY OF THE INVENTION

The invention addresses these and other problems associated with the prior art in providing a dispensing system and method of dispensing whereby a container housing a concentrated product is filled with a diluent to form a use dilution, and then is subsequently installed into a dispenser having means for automatically opening the container to give the dispenser access to the use dilution. In addition, a container is provided for use in such a system having a cap disposed thereon with a pierceable member that permits access to the interior cavity of the container when pierced.

The combination of the improved dispensing system and method, and the container for use therewith, enables diluent to be added to a container to reconstitute a concentrated product to an accurately controllable concentration. Moreover, the container may then be installed into a dispenser such that the container automatically opens during the installation, thereby reducing the exposure of the operator to the product and minimizing any additional steps required on the part of the operator.

Therefore, in accordance with one aspect of the invention, a dispensing system is provided, which includes a container housing a quantity of concentrated product and being sized to permit a quantity of diluent to be added to the concentrated product to form a use dilution; and a dispenser including opening means for automatically forming an opening in the container when the container is installed into the dispenser, and dispensing means for dispensing the use dilution to a point of use.

In accordance with an additional aspect of the invention, a method is provided for dispensing a concentrated product housed within an interior cavity of a container. The method includes the steps of filling the interior cavity of the container with the diluent to dilute the concentrated product; and installing the container into a dispenser having opening means for automatically forming an opening in a container when the container is installed into the dispenser to place the interior cavity of the container in fluid communication with the dispenser.

According to a further aspect of the invention, a container is provided including a body having an interior cavity which is externally accessible through an opening; and a cap removably coupled to the body to selectively seal the opening. The cap includes a pierceable member which permits external access to the interior cavity of the body when pierced. In addition, the cap may be removed prior to piercing the pierceable member to permit external access to the interior cavity of the body.

These and other advantages and features which characterize the invention are set forth in the claims annexed hereto and forming a further part hereof. However, for a better understanding of the invention, and the advantages and objectives attained by its use, reference should be made to the Drawing, and to the accompanying descriptive matter, in which there is described preferred embodiments of the invention.

DETAILED DESCRIPTION OF THE PREFERRED EMBODIMENTS

Figure 1:
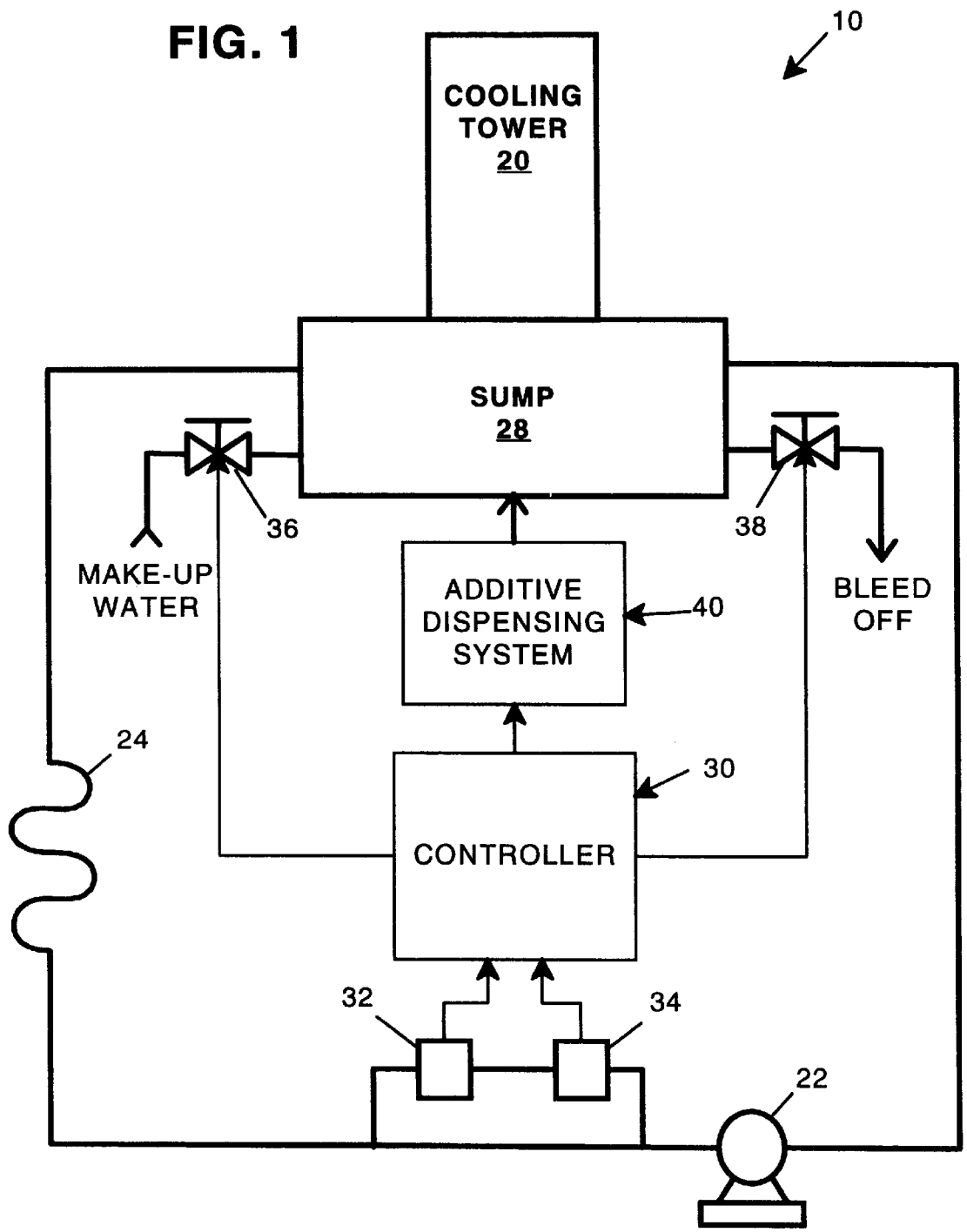
FIG. 1 is a functional block diagram of a standard HVAC cooling tower water system, showing a preferred dispensing system consistent with the principles of the invention implemented therein.

Turning to the Drawing, wherein like numbers denote like parts throughout the several views, FIG. 1 shows a typical HVAC cooling system 10 which implements the preferred dispensing system 40 consistent with the principles of the invention. Cooling system 10 is generally conventional in nature, with the preferred dispensing system implemented in lieu of a conventional additive dispenser.

Cooling system 10 generally includes a cooling tower 20 for cooling the water that is recirculated by a pump 22 through condenser coils 24 of an HVAC compressor. A sump 28 collects the water cooled in the cooling tower so that the water may be recirculated back to the condenser coils. HVAC cooling systems and/or components for such systems are available from a number of companies, including Carrier, Trane, and Marley, among others.

A controller 30 controls the concentration of dissolved solids in the sump and handles the treatment of the cooling water by monitoring and controlling the concentration of an additive dispensed into the cooling water. One example of a controller suitable for use in this application is the Pulsatrol controller available from Pulsafeeder, Inc., a unit of IDEX Corporation. For this type of controller, a pair of concentration sensors 32, 34, which are preferably conductivity sensors, are disposed in a take-off line to monitor the concentration of solids in the cooling water in a manner known in the art.

The cooling system also includes water inlet and outlet solenoid valves 36, 38 which are respectively connected to a source of make-up water and to a drain/sewage system. By selectively opening and closing valves 36, 38, controller 30 is capable of adding fresh water and dumping off "dirty" water to maintain a desired solids concentration in the cooling water.

Controller 30 also supplies an additive to the sump to treat the cooling water using a preferred dispensing system 40 consistent with the invention. Controllers such as the Pulsatrol controller are designed to work with conventional additive dispensing systems, e.g., of a type wherein a pump is used to draw out ready-to-use liquid products from large drums or totes and to supply the products directly to the sump, or alternatively to the take-off line or other suitable points throughout the recirculating system. However, the preferred dispensing system 40 replaces such conventional additive dispensing systems to provide a source of additive to the cooling water in response to an activation signal from controller 30. The preferred dispensing system may be controlled in the same manner as a conventional additive dispenser, with the only modification to the controller being an adjustment to compensate for different additive concentrations, if at all.

The aforementioned HVAC cooling system 10 is the preferred application of dispensing system 40. However, it will be appreciated that dispensing systems consistent with the invention may be used in practically any situation where a concentrated product is diluted and dispensed to a point of use, e.g. areas such as cleaning or washing applications, water treatment applications, etc. Therefore, the invention should not be understood to be limited to the particular applications disclosed herein.

Figure 2:
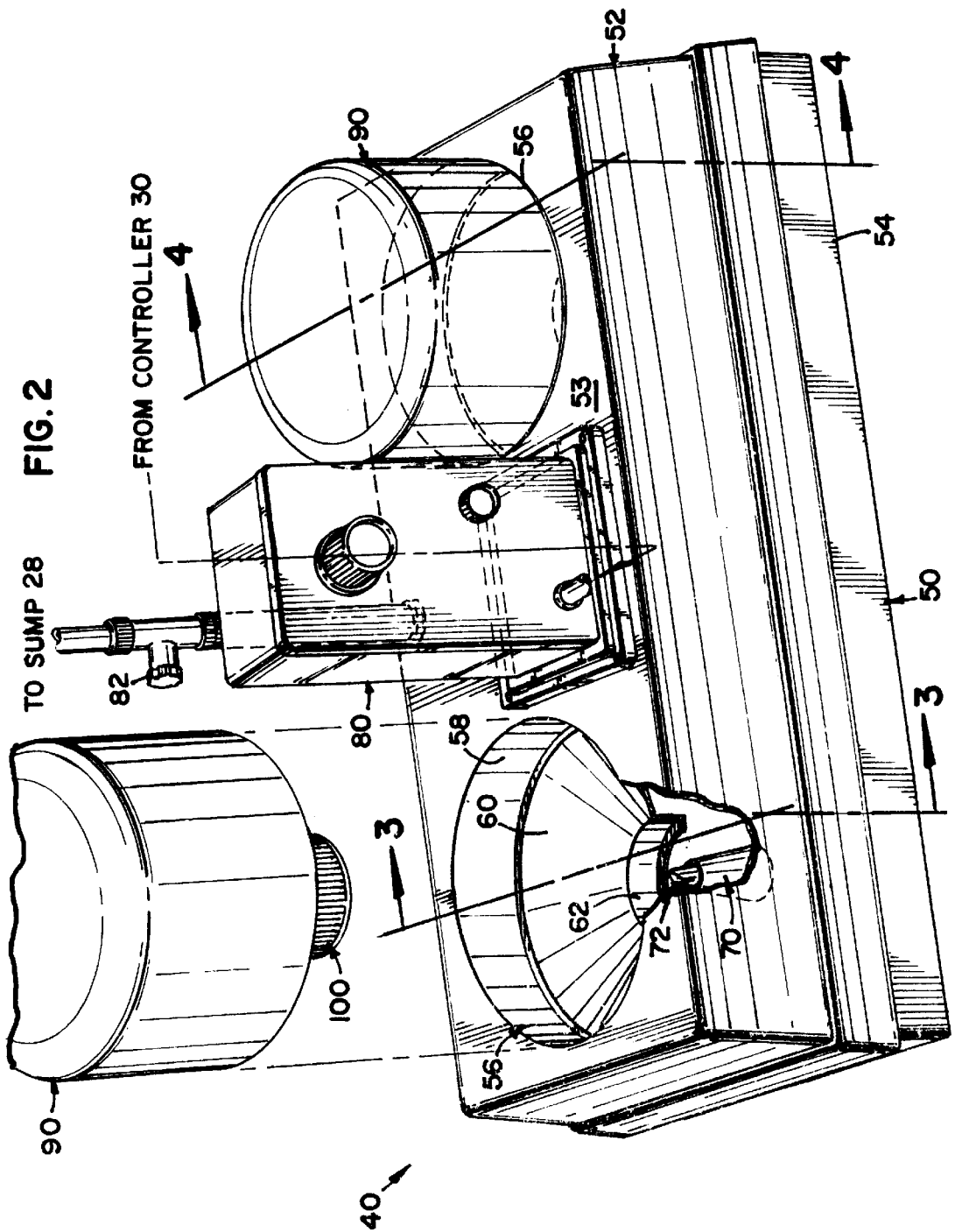
FIG. 2 is a partially exploded perspective view of the preferred dispensing system of FIG. 1, with portions thereof cut away.

A preferred embodiment of dispensing system 40 is illustrated in FIG. 2, wherein a dispenser 50 houses a quantity of use dilution (additive) supplied in one or more containers 90. Dispenser 50 has a housing which is preferably a two-part construction, with a lower half 54 forming a sump and an upper half 52 acting as a cover and providing openings 56 for receiving one or more containers 90. Lower half 54 preferably has a capacity of about 2.5 gallons (9.5 liters), with about 1.6 gallons (6.1 liters) being the normal working volume of use dilution housed within dispenser 50. Lower half 54 also supports one or more piercing towers 70 which are used to form the openings in containers 90 as they are installed in dispenser 50, as will be discussed below.

Halves 52, 54 are preferably molded from polyethylene or a similar plastic, and are snap fit together such that upper half 52 is removable from lower half 54. However, other materials, such as other plastics, metals, composites, etc. may also be used. In addition, the halves may be removably or permanently affixed to one another through various known means, or may be formed of a single piece if desired.

A plurality of openings or container supports 56 are formed in the top surface 53 of dispenser 50. Openings 56 include a plurality of walls 58, 60, 62, 64 which conform to the shape of containers 90, with corresponding surfaces on the containers mating with walls 58–64. Preferably two openings are provided in dispenser 50 to receive two containers, although any number of containers may be used in the alternative. In addition, the containers and the openings may include corresponding notches and tabs such that the containers must be rotated to a predetermined orientation to properly fit into an opening (e.g., so the labels on the containers face forward).

A piercing tower 70 is disposed below each opening 56 in dispenser 50 to operate as an opening means for automatically forming an opening in a container when the container is installed in the dispenser. Each tower 70 places the interior cavity of a container 90 in fluid communication with the sump of the dispenser when the container is installed therein. Each tower is preferably mounted to or formed on lower half 54 and fabricated from polyvinyl chloride, although other plastics, metals, or combinations thereof may be used in the alternative. In general, piercing tower 70 should provide sufficient structural rigidity to withstand the forces necessary to open a container when it is installed into the dispenser, in the manner discussed below.

Dispenser 50 also includes a pump 80 which operates as a dispensing means for dispensing the use dilution housed in the dispenser to a point of use, which in the preferred application is the sump of a cooling tower. Pump 80 is preferably a metering pump such as the Pulsatron A Plus Series electronic metering pump available from Pulsafeeder. This type of pump is a controllable low volume diaphragm-type pump which in most applications will typically supply about 0.1 to 1.5 gallons (0.4 to 5.8 liters) per day of use dilution to the sump at a working pressure of about 100 psi.

Of course, the amount of use dilution dispensed per day may vary significantly depending upon particular system requirements.

Pump 80 is preferably connected to controller 30 through an activation line, and is further connected to a suitable source of power. The pump also includes an air bleed valve 82 which places the pump in fluid communication with the cooling tower sump 28 or another point in the recirculating system. The air bleed valve is typically used at start-up to remove air from the transport line by recirculating material through the valve until a solid stream is obtained and air has been bled from the line. A dip tube or product pick-up 84 extends from fitting 82 to the bottom of dispenser 50 to withdraw use dilution from the dispenser and provide it to the cooling tower sump. Dip tube 84 preferably includes a valve 86 such as a foot ball check valve with a screen filter.

Other pumps such as peristaltic, gear, etc. pumps may be used in the alternative. In addition, other dispensing means, including vacuum or gravity feed mechanisms, may also be used to provide the use dilution, or additive, to the cooling tower sump.

Figure 5:
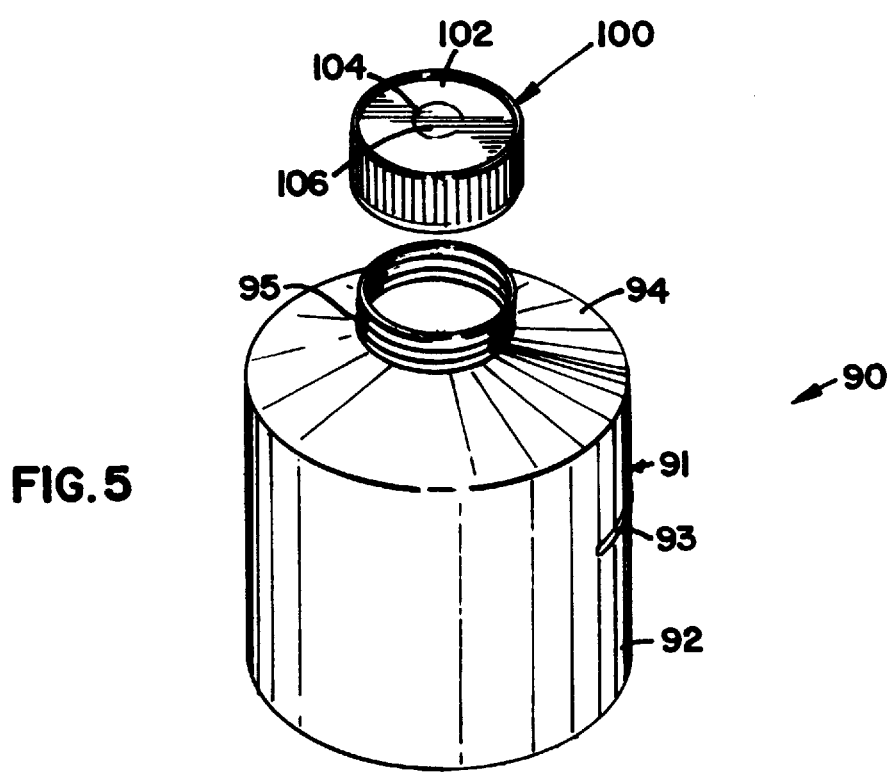
FIG. 5 is an exploded perspective view of a preferred container suitable for use in the preferred dispensing system of FIG. 1.

FIG. 5 illustrates a preferred container 90 for use with dispenser 50. Container 90 includes a body and main housing 91 having an interior cavity formed therein and defined by side walls 92 and 94 converging to a threaded neck 95. An opening is defined in threaded neck 95 to permit external access to the interior cavity. In addition, a fill mark 93 may be molded into the body, or alternatively printed on a label, to provide an indication of the level of diluent to add to the container to reconstitute the concentrated product to a desired use concentration.

Body 91 is preferably formed of polyethylene plastic or another suitable material, and is preferably transparent or translucent to permit an operator to monitor the level of product housed within the container. However, the container may be formed of other suitable non-permeable materials, and may be opaque if desired. Container 90 preferably has about a 0.8 gallon (3.0 liter) capacity, although enumerable other sizes and shapes of containers may be used depending on the particular application.

Container 90 also includes a cap 100 for selectively sealing the opening and thereby closing the container. Cap 100 is preferably threaded to mate with neck 95 and thereby form a sealed connection therewith. Other manners of coupling the cap to the container, such as snap fitting, may also be used. Cap 100 may be formed of polyethylene plastic or another suitable material, and may have differing dimensions depending upon the particular design of container 90.

Cap 100 includes a pierceable member 106 formed on its top surface 102. The preferred pierceable member 106 is defined by a weakened break line 104 circumscribing the perimeter of the pierceable member such that the pierceable member will partially or cleanly separate from cap 100 when sufficient force is applied thereto. The break line is preferably formed by die cutting the cap; however, other manners of forming a weakened area in the cap surface, including molding the break line integrally with the formation of the cap, may also be used. The pierceable member is preferably disposed on the center of the top surface of the cap, although the member may take many sizes, locations, and shapes depending on considerations such as the size and shape of the cap and the desired size, shape and flow characteristics of the opening formed therein when the pierceable member is removed.

By "pierceable member", what is meant is a member that is capable of forming an aperture or opening in the cap due to the application of force to the member during installation of the container. This may include a member which is defined by a weakened break line formed along its perimeter or within the member such that it partially or completely separates from the cap upon the application of force thereto (as in the preferred embodiment), as well as entire areas of the cap that are weakened to facilitate being punctured or perforated to deform the member and form an aperture therein. Moreover, if the cap is constructed of a material capable of being punctured, the pierceable member need not be specifically defined by any weakened portion of the cap. Therefore, a pierceable member may actually be punctured by a sharp member, or may simply be dislodged from the cap by a relatively blunter object as is found with the preferred container.

Figure 3:
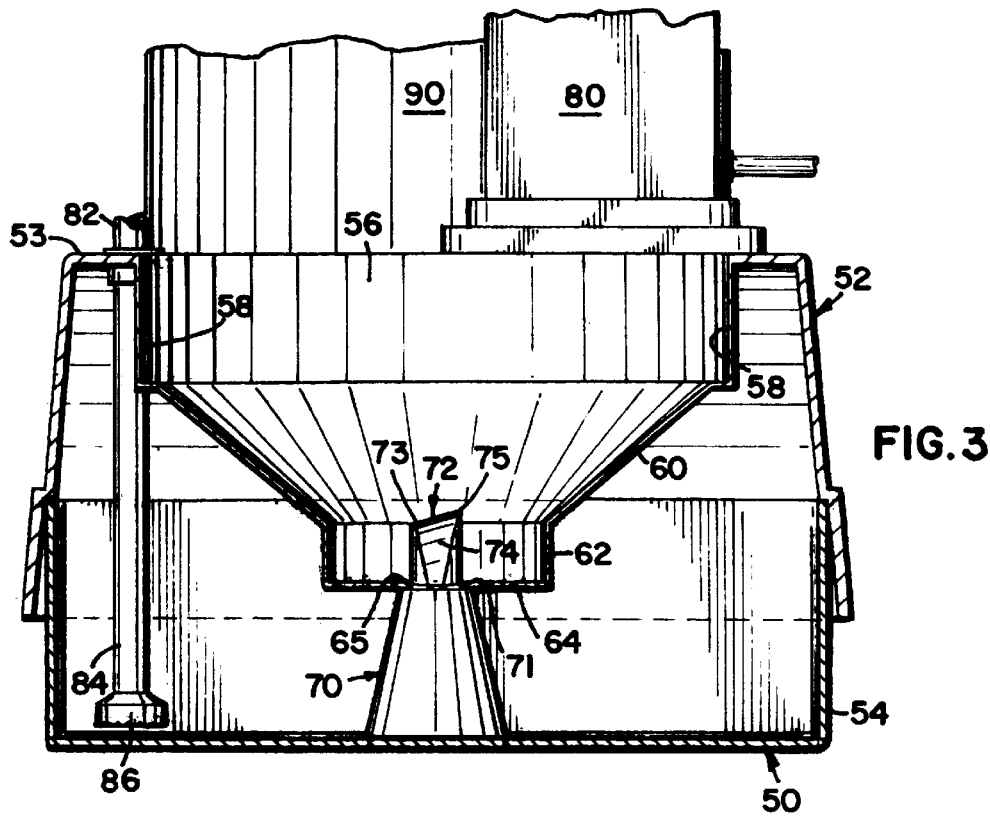
FIG. 3 is a cross-sectional view of the preferred dispensing system prior to installation of a container, taken through line 3—3 of FIG. 1.
Figure 4:
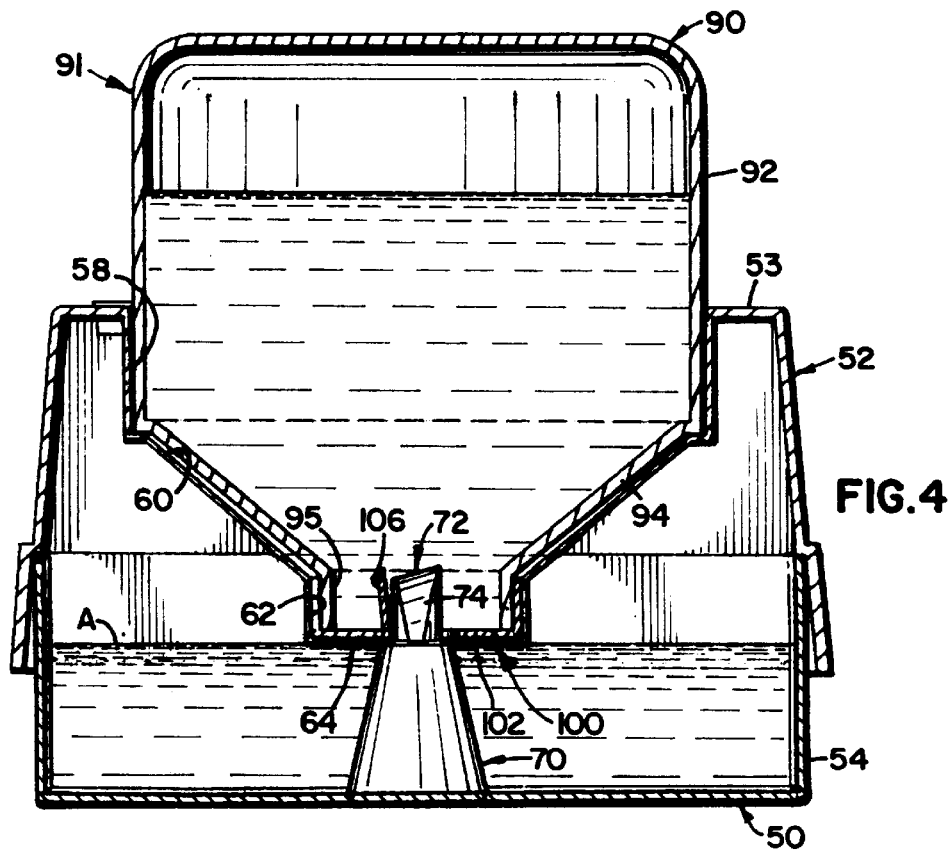
FIG. 4 is a cross-sectional view of the preferred dispensing system after installation of a container, taken through line 4—4 of FIG. 1.

The installation of a container 90 into dispenser 50 is illustrated in FIGS. 3 and 4. As shown in FIG. 3, openings 56 in dispenser 50 are defined by walls 58, 60, 62 and 64 for supporting a container in an operating position. Side walls 58 and 60 conform generally to side walls 92 and 94 of container 90. Side wall 62 generally conforms to the perimeter of cap 100 on container 90, and wall 64 generally supports top surface 102 of cap 100. The dimensions of walls 58–64 are preferably slightly larger than the corresponding dimensions on container 90 such that minimal resistance is provided for inserting or removing a container from the dispenser.

A piercing tower 70 projects through an opening 65 in wall 64. Tower 70 preferably includes a generally conical piercing member 72 having a maximum diameter which is similar to or smaller than the diameter of pierceable member 106. Member 72 narrows to an inclined ridge 73 that provides a contact point 75 for focusing the impact forces generated during the installation of the container onto a relatively small area of pierceable member 106 such that the force required to dislodge pierceable member 106 is reduced. Member 72 also includes recessed surfaces 74 which extend inwardly from the conical profile of member 72 to provide passageways for permitting the flow of use dilution out of the container and into dispenser 50. Surfaces 74 are preferably a pair of generally planar surfaces, although different numbers and profiles of surfaces may be used in the alternative to form the requisite passageways. Other sizes and shapes may also be used for piercing member 72.

The preferred piercing member 72 is relatively blunt, such that installation of the container results in the pierceable member 106 being "popped" out of the cap, but not actually deformed or punctured. In the alternative, piercing member 72 may be sharp to actually deform or cut the material in the cap and form the actual opening in the cap material, if desired.

To install a container into dispenser 50, the container is preferably inverted over one of the openings 56 (e.g., as shown by the left container in FIG. 2. Once the container is in this orientation, it is pressed down into opening 56 so that the piercing tower 70 contacts pierceable member 106 of cap 100. Further downward force applied to the container pops the pierceable member 106 upward into container 90, with the piercing member 72 of tower 70 projecting through the opening formed thereby as shown in FIG. 4. Typically, pierceable member 106 remains attached along one edge (e.g., the edge opposite point 75 as shown in FIG. 4. However, pierceable member 106 may be completely dislodged from cap 100 in some instances. Nevertheless, by virtue of the piercing member projecting to the opening formed in cap 100, the pierceable member 106 is prevented from substantially blocking the opening, whereby the use dilution may be communicated through the opening in the cap and through the space or conduit formed between the cap and the piercing member 72 (primarily along surfaces 74).

Once a container is installed into the position shown in FIG. 4, the contents thereof drain into the sump formed in lower portion 54 of dispenser 50. If the sump was empty or at least substantially below its normal operating capacity, the contents of the container may completely empty into the sump. However, if an appreciable amount of use dilution is disposed in the sump when the container is installed, the amount of use dilution communicated initially into the dispenser is automatically controlled to maintain the level of the use dilution in the dispenser proximate the opening of the cap (e.g., proximate level "A") due to the atmospheric forces, thereby retaining a portion of the container contents within the container. It will be appreciated that the atmospheric head within dispenser 50 causes the level of the sump to be maintained proximate this level by well known principles of fluid dynamics. It will also be appreciated that as use dilution is dispensed from dispenser 50 into the cooling tower sump, additional contents flow into the dispenser from containers 90 to maintain the level of fluid within the dispenser proximate this level. Through proper design of the housing and the container supports thereon, the volume of fluid retained in the housing may be reliably controlled.

As one or both of containers 90 empty over time, the containers may be replaced individually or together by removing each empty container and installing a new container in its place in the manner described above.

While the use of the piercing tower and the pierceable member in the cap of container 90 is the preferred manner of automatically opening the container upon installation, various alternatives will be appreciated by one skilled in the art. For example, the pierceable member may be formed on areas of a container other than the cap. Moreover, the pierceable member may include suitable structure to reclose the container upon its removal from the dispenser. Moreover, a door or other mechanism on the container or the cap may be used to open the container without piercing or forming a permanent opening therein and without requiring an operator to force the container into the dispenser (e.g., using a mechanical lever system).

Moreover, while the use dilution stored in the containers is directly dispensed by the dispenser, it will be appreciated that the use dilution may be further diluted or mixed with other materials prior to being dispensed. Also, different use dilutions may be provided in different containers and mixed in the dispenser. Other modifications to the preferred dispensing systems will be appreciated by one skilled in the art.

To dispense the concentrated product using dispensing system 40, one or more containers are preferably provided with a predetermined quantity of concentrated product housed therein. The containers may be sold and shipped partially filled with a concentrated product yet sized to accept a suitable quantity of diluent for generating the proper concentration of use dilution, thereby facilitating transportation and storage and reducing the overall costs associated therewith.

The preferred concentrated product for use in the preferred application is Water Care 9575 concentrated product available from Ecolab Inc. which is provided in the form of granular particles or powder that is diluted with a diluent such as water to form a use dilution for controlling scale and corrosion in HVAC cooling systems. Other concentrated products may be used, e.g. to control microbiological growth in lieu of or in addition to the aforementioned functions. Other forms of concentrated products, e.g. liquids and other solids such as blocks, tablets, briquettes, powders, flakes, etc., may also be used. Of course, in applications outside of cooling water treatment, an enumerable number of products may be used in any known concentrated forms.

Preferred containers preferably include between about 3 and 25 lbs. (1.3 and 11.4 kg), more preferably about 3.5 lbs. (1.6 kg) of product, although the amount will vary depending upon the product, the container size and the desired concentration of the use dilution. It is preferred to provide a final 1:1 ratio by weight of concentrated product and water (i.e., a 50% concentration), although the concentration will of course vary depending upon the particular product used and the required concentration for the particular system.

To dispense the concentrated product with dispensing system 40, the first step is to fill a container with a predetermined amount of water or other diluent to form a use dilution having a desired concentration. This is typically performed by removing the cap of the container and filling the container with the requisite amount of water or other diluent. A fill line (e.g., line 93 shown in FIG. 5 is preferably provided on the container wall to show the amount of diluent needed to form the desired concentration. In the preferred embodiment, the fill line is set so that an empty or used container may be filled to the fill line and used to measure the amount of water necessary to accurately generate the desired concentration. Once the empty or used container is filled to the proper amount, the water in the empty container is added to the open container housing the concentrated product to form the desired use dilution. Alternatively, a separate measuring container may be used. Moreover, the fill line may indicate the amount to fill directly into the open container housing the concentrated product, such that a separate container is not required.

Once water or other diluent is placed in the container, the next step is to seal the container with the cap and agitate or shake the container if necessary to form the use dilution with the concentrated product dispersed in the diluent (e.g., formed into a solution, suspension, emulsion, etc.). For the preferred concentrated product, the container is shaken for less than two minutes to dissolve all of the product in the diluent and form a uniform solution.

With some products, especially at higher concentrations, it may be beneficial to add the diluent in two more steps, adding portions of the diluent to the container and closing and agitating the container for each portion of the diluent until all the diluent has been added to the container to provide the final desired concentration. Particularly with higher concentrations, it may be difficult to add all of the diluent at once and form the use dilution therefrom.

Once the concentration product in the container has been reconstituted and diluted to form a use dilution, the closed container is installed in dispenser 50 by inverting the container and inserting it into one of the openings 56. As described above, by applying a downward force to the container, piercing tower 70 "pops" pierceable member 106 out of cap 100 to form an opening, whereby the contents of the container may flow into dispenser 50. The opening of the container is considered to be "automatic" since it is opened merely by placing the container in the dispenser and forcing it into its operating position. No separate steps on the part of the operator are required, and the container remains closed until it is placed into its operating position. Exposure of the use dilution to the operator is minimized since the container remains closed until it is actually installed.

Upon initial setup of dispensing system 40, two containers are preferably inserted into the dispenser to fill the sump to proximate its normal operating level. The initial pair of containers may be removed and an additional pair of containers installed to provide additional use dilution to the sump to maintain a constant level as the use dilution is dispensed therefrom. As described above, the atmospheric head in the dispenser maintains a level in the sump proximate level "A". Thereafter, containers may be replaced separately or together on an as-needed basis, typically when one or both of the containers are empty. Moreover, if operators forget to check and replace the containers, the sump still provides a quantity of use dilution that may be used for a period of time before the supply runs out.

Various additional changes and modifications may be made to the preferred embodiments without departing from the spirit and scope of the invention. Therefore, the invention lies solely in the claims hereinafter appended.

What is claimed is:

1. A dispensing system comprising:
    (a) a container housing a quantity of concentrated product and being sized to permit a quantity of diluent to be added to the concentrated product to form a use dilution; wherein the concentrated product is an additive for treating cooling water in a heating system or an air conditioning cooling system and
    (b) a dispenser including:
        (1) a housing forming a sump for retaining a quantity of the use dilution, the housing including an opening for supporting the container;
        (2) opening means for automatically forming an aperture in the container when the container is installed into the dispenser; and
        (3) dispensing means comprising a pump, in fluid communication with the housing, for dispensing the use dilution from the container to a point of use, wherein the container forms an atmospheric head to automatically maintain the level of use dilution housed in the sump at a predetermined level so long as a quantity of use dilution is retained in the container.

2. The dispensing system of claim 1, wherein the aperture in the container is defined by a pierceable member, and wherein the opening means includes a piercing member for dislodging the pierceable member from the container to form the aperture when the container is placed into an operating position in the dispenser.

3. The dispensing system of claim 2, wherein the piercing member is disposed on a tower projecting upwards from the sump directly below the aperture in the container.

4. The dispensing system of claim 3, wherein the pierceable member is disposed on a cap removably secured to the container; whereby the container may be filled with diluent prior to installation in the dispenser.

5. The dispensing system of claim 3, wherein the piercing member is generally conical and projects at least partially into the aperture in the container when the container is in the operating position.

6. The dispensing system of claim 5, wherein the piercing member includes at least one recessed surface forming a conduit through the aperture in the container.

7. The dispensing system of claim 3, wherein the atmospheric head in the container maintains the level of use dilution housed in the sump proximate the aperture in the container.

8. The dispensing system of claim 1, wherein the housing includes a second opening for supporting a second container of use dilution.

9. A method of dispensing a concentrated product; wherein the concentrated product is an additive for treating cooling water in a heating system or an air conditioning cooling system; housed within an interior cavity of a container, the method comprising the steps of:
    (a) filling the interior cavity of the container with a diluent to form a use dilution;
    (b) installing the container into a dispenser having a housing forming a sump for retaining a quantity of the use dilution and an opening means for automatically forming an aperture in the container when the container is installed into the dispenser to place the interior cavity of the container in fluid communication with the dispenser;
    (c) forming an atmospheric head in the container to maintain the level of use dilution in the housing at a predetermined level; and
    (d) dispensing the use solution from the dispenser with a pump.

10. The method of claim 9, further comprising the step of agitating the container prior to the installing step to mix the concentrated product with the diluent in the container.

11. The method of claim 10, wherein portions of the diluent are mixed with the concentrated product in steps, wherein the filling and agitating steps are performed for each portion of diluent.

12. The method of claim 11, further comprising the steps of opening a cap on the container before filling the container and closing the cap on the container before agitating the container.

13. The method of claim 12, wherein the opening means includes a piercing member disposed within a housing in the dispenser, wherein the cap in the container includes a pierceable member, and wherein the installing step includes the steps of inverting the container such that the cap faces downward and forcing the container into an operating position in the dispenser such that the piercing member dislodges the pierceable member from the cap to form the aperture in the container.

14. The method of claim 13, further comprising the step of maintaining the level of use dilution in the housing proximate the aperture in the container.

15. The method of claim 9, wherein the concentrated product is a granular powder.

16. A dispensing system comprising:
    (a) a container housing a quantity of concentrated product; wherein the concentrated product is an additive for treating cooling water in a heating system or an air conditioning cooling system; and being sized to permit a quantity of diluent to be added to the concentrated product to form a use dilution, the container including a cap removably secured to the container, the cap including a pierceable member disposed thereon; and
    (b) a dispenser including:
        (1) opening means for automatically forming an aperture in the container when the container is installed into the dispenser, the opening means including a piercing member for dislodging the pierceable member from the container to form the aperture when the container is placed into an operating position in the dispenser; and
        (2) dispensing means for dispensing the use dilution from the container using a metering pump to a point of use.

17. A method of dispensing a concentrated product; wherein the concentrated product is an additive for treating cooling water in a heating system or an air conditioning cooling system; housed within an interior cavity of a container, the method comprising the steps of:

(a) opening a cap on the container;

(b) filling the interior cavity of the container with a diluent to dilute the concentrated product to form a use solution;

(c) closing the cap on the container;

(d) agitating the container to mix the concentrated product with the diluent in the container; and (e) installing the container into a dispenser having opening means for automatically forming an aperture in the container when the container is installed into the dispenser to place the interior cavity of the container in fluid communication with the dispenser; the dispenser comprising a metering pump to dispense the use solution.

18. The method of claim 17, wherein the opening means includes a piercing member disposed within a housing in the dispenser, wherein the cap in the container includes a pierceable member, and wherein the installing step includes the steps of inverting the container such that the cap faces downward and forcing the container into an operating position in the dispenser such that the piercing member dislodges the pierceable member from the cap to form the aperture in the container.

19. The method of claim 18, further comprising the step of maintaining the level of use dilution in the housing proximate the aperture in the container.

* * * * *